Figure 1:
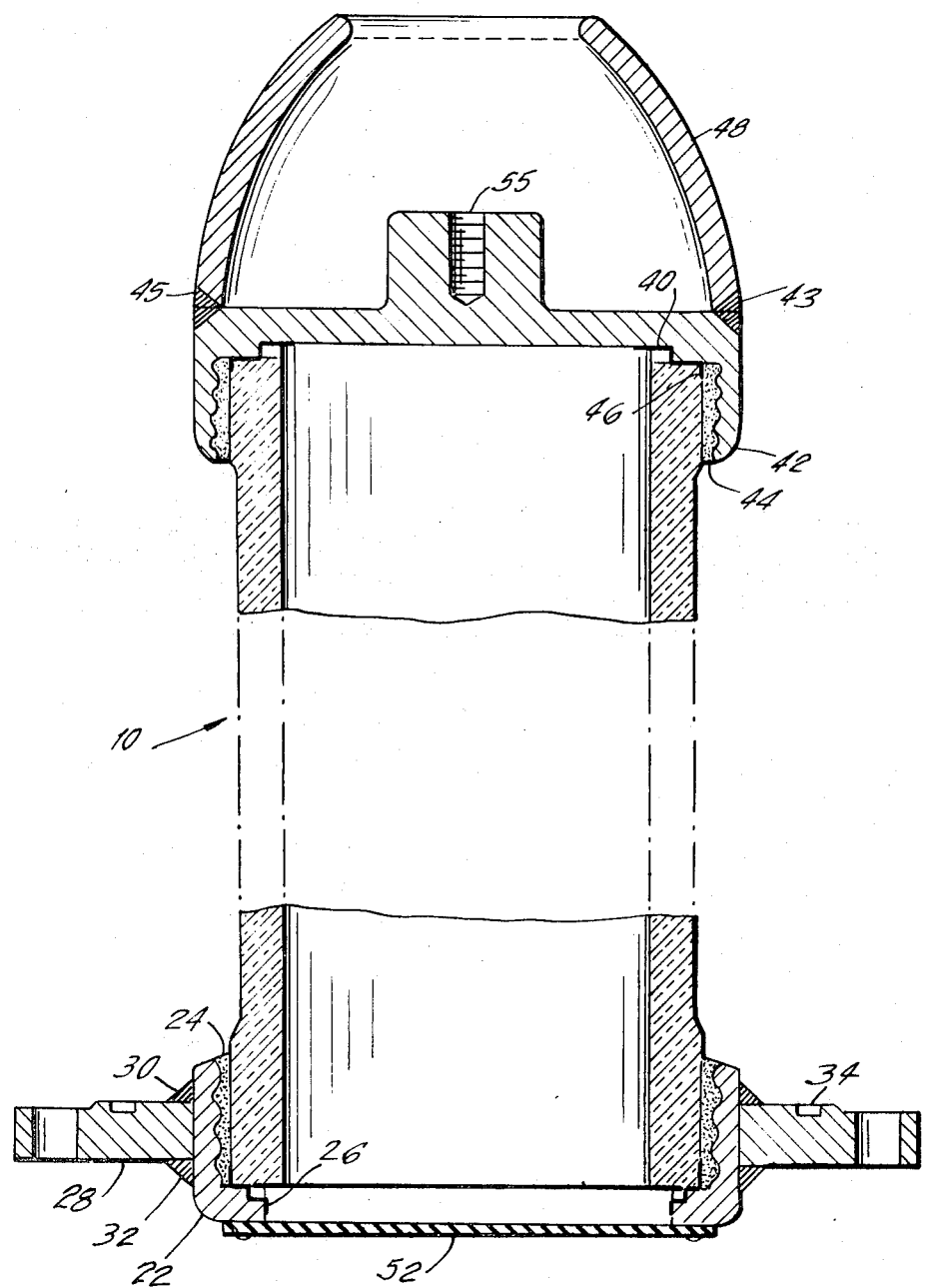

United States Patent

[11] 3,624,450

| [72] | Inventor | Howard W. Graybill |
| | | Greensburg, Pa. |
| [21] | Appl. No. | 31,589 |
| [22] | Filed | Apr. 24, 1970 |
| [45] | Patented | Nov. 30, 1971 |
| [73] | Assignee | I-T-E Imperial Corporation |
| | | Philadelphia, Pa. |

[54] METAL ENCLOSED GAS INSULATED LIGHTNING ARRESTER
4 Claims, 2 Drawing Figs.

[52] U.S. Cl........................................... 317/62,
 315/36
[51] Int. Cl........................................... H02h 1/04
[50] Field of Search................................... 337/34;
 317/62, 61; 315/36; 313/DIG. 5; 174/28, 2

[56] References Cited
UNITED STATES PATENTS

| 2,915,674 | 12/1959 | Kalb | 315/36 |
| 3,348,001 | 10/1967 | Upton | 174/28 |
| 3,469,146 | 9/1969 | Harder | 317/61 |

Primary Examiner—J. D. Miller
Assistant Examiner—Harvey Fendelman
Attorney—Ostrolenk, Faber, Gerb & Soffen ABSTRACT: Sealing rings hermetically seal the opposite ends of a metal enclosed arrester housing to prevent leakage of pressurized, high dielectric gas inside the arrester, and a frangible diaphragm is included to permit exhaust of hot gases into the atmosphere rather than into the pressurized gas surrounding the unit.

METAL ENCLOSED GAS INSULATED LIGHTNING ARRESTER

This invention relates to a high-voltage lightning arrester mounted in a grounded metal enclosure, with a pressurized gas filling the space between the arrester and the enclosure so as to permit use of a smaller enclosure than would otherwise be required if such space were filled with air at atmospheric pressure.

Compressed-gas insulated conductors are normally comprised of metal enclosed high-voltage electrical conductors in which a metallic conductor, generally tubular and of a first diameter, is centrally supported within a grounded metal tube of larger diameter by means of a solid disc or cone-shaped insulator. The metallic inner conductor is insulated from the enclosure tube by means of a compressed gas such as sulfurhexafluroide (SF) having a high dielectric characteristic. Such electrical conductors may be used as buses in electrical substations, or generating stations, or for transmission of electrical power over either short, intermediate or long distances. These metal-enclosed high-voltage electrical conductors may be buried underground or supported at some convenient height above ground.

The principal advantage of compressed-gas insulated buses in a transmission system, as compared with conventional open buses, is a tremendous reduction in the space requirements which such multiphase bus systems occupy. Whereas extra high-voltage (EHV) buses of open construction in air normally require ground clearances of 8 to 15 feet and phase spacings of 15 to 25 feet, buses of the metal-enclosed compressed-gas type, can be provided with ground clearances of as little as 4 to 10 inches and phase spacings of as little as 24 to 42 inches for the same voltage rating. In addition thereto, the compressed-gas insulated bus having a grounded metal enclosure for each phase offers greater reliability and safety as compared with conventional, open EHV conductors.

Along with the increasing interest in gas insulated transmission system, there has been an increasing recognition that many types of electrical apparatus can be employed in such metal enclosed, gas-insulated substations. Thus, circuit breakers, bus and disconnect switches, potential transformers, cable terminations and coupling capacitor potential devices have also been envisioned as being enclosed in the grounded metal enclosures. By filling the space between energized parts and their grounded metal enclosures with a compressed insulating gas such as $SF_6$, the ground clearance for such enclosures can also be reduced to one-tenth or less than the distance required in open air, because of the increased dielectric strength. As a result, substations can be made more compact, control trenches and wiring can be made shorter and less costly, and the savings in land required can be substantial. Metalclad equipment of this type may additionally permit a substation to be brought closer to the load center, to result in appreciable cost savings in subtransmission, particularly where cable circuits are required. Where appearance is important, the metalclad unit can be built with a much lower profile (to be more easily screened), and such metalclad construction becomes very highly desirable where zoning requirements establish the need for a physical building for the substation.

In addition to the savings in land area, metal enclosed substations can have other important advantages over conventional open air constructions. By having all high-voltage parts enclosed in the grounded metal enclosures, for example, the possibility of electrical shock to operating personnel in the area is eliminated. Similarly, since the high-voltage electrical insulation spacers are enclosed, and surrounded by dry, substantially dust-free noncorrosive gas, the possibility of insulation flashover due to accumulation of dirt and moisture on the surface of the insulators is removed. Outages due to insulation flashovers because of fog or other high precipitation atmospheres are thus eliminated.

In order to increase the benefits which follow from the use of metal enclosed substations, it would be desirable to also include the lightning arrester in a metal housing similarly filled with the compressed insulating gas. As is well known, these units are employed to limit voltage surges entering the substation on incoming lines, caused either by lightning impulses or by switching operations from circuit breaker or disconnecting switch use. If these voltage surges are not in some way limited by lightning arresters or like units, the high voltages produced may lead to a puncture in the solid insulation of transformers cooperating therewith. As will be appreciated, such punctures cause prolonged outage, at least until the apparatus can be repaired.

While a simple spark gap device, which is short enough to flashover from the live electrode to the ground electrode, may protect such apparatus from high-voltage surge, such a device is not entirely satisfactory since it will continue to arc until the power frequency voltage is removed by the opening of a circuit breaker. That is, a brief power termination is necessary in order to interrupt the ground fault current that follows the sparkover of such a unit. Known lightning arresters, on the other hand, sparkover whenever abnormally high voltages are present, but clear the ground fault current as soon as the voltage returns to its normal power frequency level. Voltage surges, can thus be discharged to ground without the spark gap needed for temporary interruption of normal electric service.

In prior metal enclosed gas-insulated substations, the need for voltage surge protection either has been completely ignored, treated by the use of the simple spark gap arrangement described above, or treated by the use of lightning arresters mounted outside the metal enclosed gas-insulated portion of the substation. In this latter arrangement, high-voltage cables have been used in open connection from an entrance bushing to the arrester unit.

In attempting to apply the compressed insulating gas technology of the metalclad substation to lightning arrester devices, it has been found that the pressurized gas has a tendency to leak into the arrester unit. Such leakage of a high dielectric strength gas has been noted to double to triple the spark over voltage of the arrester (where $SF_6$ was employed), to render the arrester inoperable.

A second problem is that with very heavy or repeated surges in any lightning arrester, there very definitely exists a buildup of pressure inside the arrester which could lead to an explosion of its housing if no venting means were provided.

It is a primary object of the present invention, therefore, to provide a lightning arrester construction which is completely enclosed in a grounded metal housing, with the spacing between the body of the arrester and the housing filled with a compressed insulating gas.

It is another object of the invention to provide such a lightning arrester with adequate sealing between the interior of the arrester body and the surrounding insulating gas to reduce leakage of such gas into the arrester so as to avoid variation in its rated sparkover voltage.

It is a further object of the invention to provide a frangible diaphragm within such a lightning arrester so as to permit the exhaust of hot gases from the unit into the atmosphere rather than into the compressed insulating gas surrounding the arrester unit.

Figure 2:
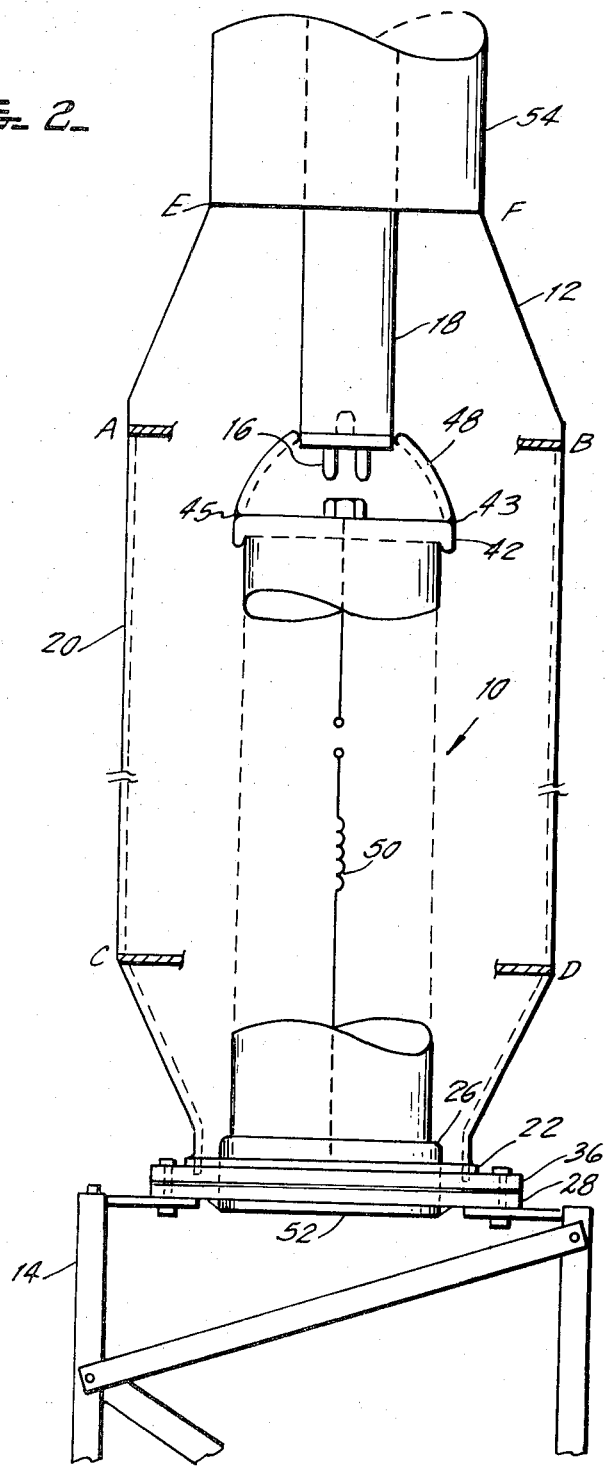

These and other objects of the invention will become more clearly understandable from a consideration of the following description taken in connection with the accompanying drawing in which:

FIGS. 1 and 2 show the lightning arrester of the present invention in a preferred embodiment as it might be used in a 345 kv. metalclad substation environment.

Using metalclad substation design as compared to open bus design for systems which operate at extra high-voltage ratings is expected to yield an eight to one reduction in overall site requirement for the full station (50,000 square feet as compared to 410,000 square feet), with further reductions in site requirements believed to be obtainable as operating experience is gained and additional refinements in design effected.

DESCRIPTION OF THE LIGHTNING ARRESTER OF FIGS. 1 AND 2

The lightning arrester of the present invention is indicated by the reference notation 10, with its construction being shown in FIG. 1 and its position within a generally tubular shaped metal enclosure 12 being shown in FIG. 2. The enclosure 12 and arrester 10 are mounted on a suitable fabricated metal stand 14, sufficiently rigid to support the assembly and configured to permit exhaust gases generated with the arrester 10 to be discharged to the atmosphere (as to be described below). The arrester length for a 345 kv. environment may be of the order of 10 feet, with the arrester being inserted within the enclosure 12 so as to have a minimum clearance of about 6 inches between the arrester and the interior surface of sidewalls 20 of the enclosure tube 12. Such walls 20 may be three-eighths of an inch thick with the overall enclosure 12 having a maximum outer diameter of some 30 inches. After the arrester 10 is positioned as shown and connected by means of tulip contacts 16 or similar such arrangements to a substation conductor 18 maintained at line potential, the walls 20 of the enclosure 12 are fitted in place and welded to the top and bottom ends at the points A-D to form the tube 12, for example. The space between the lightning arrester 10 and the enclosure 12 is then filled by a compressed-insulating gas, such as SF.

An aluminum casting 22 is further shown at the bottom of the arrester 10, and will be understood to be cemented thereto. To prevent the $SF_6$ or other insulating gas surrounding the arrester 10 from leaking through the cement 24 into the interior of the arrester, a solder-seal ring 26 is used. This ring 26 is soldered onto a metallized portion on the glaze of the arrester housing tube (of porcelain for example), and, at the other end, is soldered or welded to the aluminum casting 22 (or other metal ring) surrounding the bottom of the porcelain housing. A flange 28 is additionally welded to the casting 22 (as at 30, 32) and, in turn is bolted, with suitable gaskets 34 to prevent leakage of the $SF_6$ insulating gas to the atmosphere. As shown in FIG. 2, this bolting is made to a second flange 36 which is welded to and forms a part of the metal enclosure 12. In this manner the lightning arrester 10 is completely enclosed within the grounded metal housing 12 and so situated that adequate sealing exists to minimize leakage of the insulating gas into the interior of the arrester.

A second solder seal ring 40 is used to form a hermetic seal to the porcelain housing of the arrester to similarly prevent such insulating gas leakage at the top of that unit. An analogous aluminum casting 42 is shown, as is the cement installation 44 and metallized glazed portion 46 on the arrester housing to which the ring 40 is soldered. A metal cap 48 (which may, for example, be aluminum) is fitted at the top of the arrester 10 and suitably provided with a radius of curvature and smooth surface sufficient to reduce corona which may otherwise occur in the region of sharp points or edges of metallic members positioned within the high dielectric field. In one construction of the invention, the corona shield 48 extended some 7 inches above the casting 42 and had an opening of 6½ -inches diameter through which the electrical conductor 18 passed to make tulip clip contact with a metallic rod (not shown) which threadedly engages tapped opening 55 in casting 42. Casting 42 is electrically connected to sparkover element 50. As indicated, a pair of welds 43, 45 serve to secure the corona shield 48 to the casting 42.

A frangible diaphragm 52 is also shown at the bottom of the arrester 10 to vent, any exhaust gases built up within the arrester assembly under a heavy or repeated voltage surge, directly to the atmosphere if necessary.

Connection of the lightning arrester 10 to the substation bus is made directly by means of the conductor tube 18. Tube 18 is at line potential, with the outer, concentric metal tube 54 being at ground potential and welded directly to the enclosure 12 at the points labeled E, F. The hollow interior region between the two concentric tubes 18 and 54 is similarly filled with the $SF_6$ gas and surrounds the arrester 10 to insulate its housing from the enclosure walls 20.

Although there has been described a preferred embodiment of this novel invention, many variations and modifications will now be apparent to those skilled in the art. Therefore, this invention is to be limited, not by the specific disclosure herein, but only by the appending claims.

I claim:

1. Electrical circuit protection apparatus comprising, in combination:
    a bus section including an elongated tubular inner conductor and a tubular metallic enclosure spaced from and surrounding said inner conductor;
    an elongated airtight housing comprising a hollow insulating shell having metallic end caps;
    lightning arrester means enclosed within said airtight housing, first and second ends of said lightning arrester means being electrically connected to associated ones of said end caps;
    said housing being axially aligned with said inner conductor;
    means for electrically coupling one of said end caps to one end of said inner conductor;
    a second metallic enclosure being spaced from and surrounding said airtight housing;
    first means for joining one end of said second metallic enclosure to one of said end caps;
    second means for joining and airtightly sealing the remaining end of said second metallic enclosure to one end of said bus section metallic enclosure;
    the hollow interior region between said bus section inner conductor and metallic enclosure communicating with the hollow interior region between said airtight housing and said second metallic enclosure and being provided with a pressurized gas of high dielectric strength;
    said first joining means including means for airtightly sealing the junction between said airtight housing and said second metallic enclosure.

2. The apparatus of claim 1 wherein said first and second metallic enclosures and one of said end caps are maintained at ground potential.

3. Electrical circuit protection apparatus comprising, in combination:
    a bus section including an elongated tubular inner conductor and a tubular metallic enclosure spaced from and surrounding said inner conductor;
    lightning arrester means including an elongated airtight housing for mounting lightning arrester means therein;
    said lightning arrester means airtight housing being axially aligned with said inner conductor;
    means for electrically joining one end of said lightning arrester means to said inner conductor;
    a second metallic enclosure being spaced from and surrounding said lightning arrester means airtight enclosure;
    first means for electrically connecting and airtightly sealing one end of said second metallic enclosure to said bus section metallic enclosure;
    second means for airtightly sealing the opposite end of said second metallic enclosure to the adjacent end of said lightning arrester means airtight enclosure;
    a hollow region defined by said bus section inner conductor and metallic enclosure communicating with the hollow region defined by said lightning arrester means airtight enclosure and said second metallic enclosure and being filled with pressurized gas of high dielectric strength;
    said lightning arrester means airtight enclosure being adapted to prevent said pressurized insulating gas from entering into said lightning arrester means airtight enclosure.

4. The apparatus of claim 3 wherein the end of said lightning arrester means airtight enclosure remote from said bus section is provided with a frangible diaphragm for directly venting the interior of said lightning arrester means airtight enclosure to the surrounding atmosphere responsive to the build up of pressure within said airtight enclosure beyond a predetermined level and thereby prevent any gases contained within said airtight enclosure from entering into the region occupied by the pressurized gas of high dielectric strength.

* * * * *

UNITED STATES PATENT OFFICE
CERTIFICATE OF CORRECTION

Patent No. 3,624,450    Dated November 30, 1971

Inventor(s) Howard W. Graybill

It is certified that error appears in the above-identified patent and that said Letters Patent are hereby corrected as shown below:

Column 1, line 16, "(SF )" should read -- $(SF_6)$ --

Column 2, line 38, "to" (second occurrence) should read -- or --

Column 3, line 10, "with" should read -- within --

Column 3, line 26, "(SF )" should read -- $(SF_6)$ --

Signed and sealed this 22nd day of May 1973.

(SEAL)
Attest:

EDWARD M. FLETCHER, JR.
Attesting Officer

ROBERT GOTTSCHALK
Commissioner of Patents